(12) United States Patent
Yudanov

(10) Patent No.: US 7,549,410 B2
(45) Date of Patent: Jun. 23, 2009

(54) FUEL INJECTION SYSTEM SUITABLE FOR LOW-VISCOSITY FUELS

(75) Inventor: Sergi Yudanov, Frölunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 12/088,709

(22) PCT Filed: Oct. 19, 2005

(86) PCT No.: PCT/SE2005/001567

§ 371 (c)(1),
(2), (4) Date: Mar. 31, 2008

(87) PCT Pub. No.: WO2004/046733

PCT Pub. Date: Apr. 26, 2007

(65) Prior Publication Data

US 2008/0202471 A1    Aug. 28, 2008

(51) Int. Cl.
*F02M 37/04*    (2006.01)
*F02M 37/00*    (2006.01)

(52) U.S. Cl. .................. 123/506; 123/510; 123/514; 123/467

(58) Field of Classification Search ......... 123/446–447, 123/506, 514, 467, 458
See application file for complete search history.

(56) References Cited

U.S. PATENT DOCUMENTS

| | | | | |
|---|---|---|---|---|
| 4,019,481 A * | 4/1977 | Lakra | .................. | 123/447 |
| 4,211,202 A * | 7/1980 | Hafner | .................. | 123/457 |
| 4,440,132 A * | 4/1984 | Terada et al. | .................. | 123/446 |
| 5,622,152 A * | 4/1997 | Ishida | .................. | 123/446 |
| 6,675,773 B1 * | 1/2004 | Mahr et al. | .................. | 123/446 |
| 2004/0255908 A1 * | 12/2004 | Udd et al. | .................. | 123/446 |
| 2005/0000493 A1 * | 1/2005 | Yudanov | .................. | 123/446 |
| 2005/0045149 A1 * | 3/2005 | Udd et al. | .................. | 123/446 |
| 2005/0133629 A1 * | 6/2005 | Stringfellow | .................. | 239/533.2 |
| 2006/0196474 A1 * | 9/2006 | Magel | .................. | 123/446 |

FOREIGN PATENT DOCUMENTS

| EP | 1541860 A1 | 6/2005 |
|---|---|---|
| WO | 03081025 A1 | 10/2003 |
| WO | 03091566 A1 | 11/2003 |

OTHER PUBLICATIONS

International Search Report from corresponding International Application PCT/SE2005/001567.

* cited by examiner

*Primary Examiner*—Thomas N Moulis
(74) *Attorney, Agent, or Firm*—WRB-IP LLP

(57) ABSTRACT

A fuel injection system for an internal combustion system includes an Engine Management System (EMS), a fuel feed pump, a return line, a high-pressure pump, supplying fuel under pressure to a common rail, a hydraulically operated valve forming an outlet chamber connected to the common rail and a control chamber, the valve being designed such that, in its closed position, the valve prevents the flow out of the outlet chamber, and an electrically operated pilot valve. A nozzle with a resilient member that biases the nozzle towards closing is connected to the outlet of the hydraulically operated valve in such a way that pressure at the outlet of the hydraulically operated valve tends to overcome the force of the resilient member and open the nozzle. An electrically operated spill valve is connected between the outlet of the hydraulically operated valve and the return line.

10 Claims, 3 Drawing Sheets

FUEL INJECTION SYSTEM SUITABLE FOR LOW-VISCOSITY FUELS

BACKGROUND AND SUMMARY

The present invention relates to fuel injection systems for internal combustion engines, in particular, systems suitable for injection of low viscosity fuels such as Di-Methyl Ether (DME) into compression-ignition engines.

Some low-viscosity fuel injection systems have been designed following the principle of the known high-pressure common rail systems for diesel fuel, in which fuel is pressurized by a single pump into a pressure vessel or rail that is common for a plurality of injectors, and injections are controlled by electrically actuated valves placed between the common rail and the injectors. This kind of injection system is better suited for fuels with widely variable, pressure and temperature-dependent properties typical to these of DME, than injection systems based on the pump-line-nozzle or unit injector principle, partially because the processes of creating and controlling the injection energy for each injection are divided in time and therefore do not complicate each other as much as when they occur simultaneously. The subject of the present invention is a common rail fuel injection system for injecting a low viscosity fuel into internal combustion engines.

An example of a prior art injection system is disclosed in the U.S. Pat. No. 6,189,517.

One technical difficulty that arises when a common rail injection system is designed for use with low-viscosity fuels is that, due to relatively low specific energy of low viscosity fuels such as DME, the volume to be passed through the injectors and control valves to obtain a given engine power, is relatively big. This necessitates relatively large controlled areas in the valves, which usually conflicts with the requirements of small overall dimensions, quick response times and small control and static leakages in the injection system. In the prior art injection system of U.S. Pat. No. 6,189,517, the leakage problem is additionally exacerbated by the use of small area passages that connect the downstream side of the electrically actuated valves to the return line in order to eliminate possible uncontrolled injections and leakage of fuel past the closed nozzle into the engine which is possible because of the low viscosity of the DME. An improvement to this design has later been disclosed in which the electrically actuated valves are of a three-way spool type such that they can connect the injector nozzle alternately to the source of pressure and to the return line. Such a three-way spool valve partially solves the problem of parasitic leakage during the injection event that is present in the prior art system described in U.S. Pat. No. 6,189,517, but introduces leakages past the clearances in the spool valve. Such leakages have been found to negatively affect hydraulic efficiency and controllability even in the conventional diesel fuel injection systems. The approximately 10 times lower viscosity of DME would bring in an increase in leakage rate of about the same magnitude. Reducing clearances in the spool to limit the leakage is not technically feasible both because they are already close to a minimum and because low-viscosity fuels have poor lubricity, which greatly increases the risk of seizure in close-fit spools.

A possible solution to this is a three-way, hydraulically unbalanced valve with two tapered or flat seats, in which the pressurized volume can be isolated by relatively long precision-matched guide ensuring acceptable leakage. The basic design of such a valve is well-known in the art and is successfully utilized in the fuel injection systems to control relatively small pilot flows, as disclosed, for instance, in EP1120563A2. However, this principle can hardly be realized to control full flow of fuel to be injected, especially in the case of increased volume deliveries necessary when using DME, because the size of the valve becomes prohibitively large for the good response times and acceptable electrical power consumption to be maintained. Thus, a novel approach to the design of the hydraulic control system of the low-viscosity fuel common rail system is required.

The poor lubricity and potentially big leakage of the low-viscosity fuels, on one hand, and their low-sooting combustion properties, on the other hand, dictate the choice of relatively low injection pressures. Low fuel pressure levels not only require extra large flow areas in the control valves of the injection system, but also make it necessary to use high-flow nozzles in order to keep the injection time periods short enough for good engine fuel efficiency. The design of conventional high-pressure diesel injection nozzles which are used in the system disclosed in U.S. Pat. No. 6,189,517 B1, limits the size and number of injection orifices that can be used. Another unfavorable aspect of using conventional high-pressure diesel injection nozzles in a low-viscosity injection system is their relatively high cost and complexity.

Yet another negative aspect of using conventional diesel nozzles in a low-viscosity fuel system is that the leakage past the needle guide of such nozzles can also become relatively large. Therefore, it would be beneficial to design a low-viscosity fuel injection system that utilizes a nozzle which is characterized by reduced leakage and allows large opening flow areas. A reduction in the leakage can also allow cost reduction of the fuel system by making a fuel cooler redundant. The fuel cooler may otherwise be necessary because higher leakage causes conversion of more hydraulic power into heat which has to be removed from the system.

It is desirable to improve fuel economy of a low viscosity fuel-powered engine with a fuel injection system of the common rail type by means of limiting the parasitic hydraulic losses due to static and control fuel leakages, improving injection controllability and reducing duration of injection. It is also desirable to reduce the cost of the fuel injection system, which can be achieved by reducing leakages in the system and by simplification of the nozzle design.

The fuel injection system according to an aspect of the present invention incorporates a three-way electrically operated pilot valve that controls a hydraulically operated valve positioned between a common rail and a nozzle, a differential hydraulic valve positioned upstream of the nozzle with its outlet connected to the inlet of the nozzle, and an electrically operated, two-way, normally open spill valve positioned between the outlet of the hydraulically operated valve and a return line. The nozzle has a leak-free design with a poppet-type valve that is biased towards its closed position by a spring and can open outward in the direction of the engine combustion chamber when fuel pressure in the nozzle exceeds the nozzle opening pressure, which is determined by the backpressure in the combustion chamber of the engine and the force of the spring. Such nozzle design features significantly bigger, than in conventional high-pressure diesel nozzles, ratio of open effective flow area to valve lift.

All control valves in the present invention have either tapered or flat seats which provides for minimum possible leakage in the closed state of the valves. The pilot valve is very small because it only controls the little flow necessary for switching the hydraulically operated valve. Due to its small size, the pilot valve can be hydraulically unbalanced with positive sealing of both seats, and the leakage past the valve stem is also small due to its small diameter, typically 3 mm, and relatively long stem sealing length.

The hydraulically operated valve can also be made with relatively small stem diameter, typically 4 mm, because its lift can be relatively big compared to what is achievable with electrically operated valves. The sealing length of the stem can be made sufficiently long to achieve small leakage. Preferably, the hydraulically operated valve has tapered seat for positive sealing.

The spill valve can also be made very small, because its purpose is to assist the nozzle valve's and the hydraulically operated valve's closure and relieve residual pressure in the nozzle in order to limit possible leakage of the fuel into combustion chamber and/or uncontrolled injections that could otherwise be possible in case of imperfect sealing in the hydraulically operated valve and consequent pressure build-up in the nozzle.

The differential hydraulic valve performs the same function as that of the resilient check valve described in the U.S. Pat. No. 6,189,517 B1 referred to above. This function is to prevent the leakage of the fuel into the engine after the engine shutdown. The differential hydraulic valve stays fully open during engine operation and does not participate in the injection control.

Due to the design of the control system of the present invention, characterized by the fact that the electrically operated valves do not directly control the full flow of fuel to be injected into the engine, these valves and their actuators can be made sufficiently small to be fitted directly in the injector. This minimizes the dead hydraulic volumes and helps achieve more accurate control of fuel injection, in particular, of small fuel quantities.

Conventional high-pressure diesel injection nozzle can also be used in the present invention in cases when its injection spray pattern is more advantageous for a particular combustion system, than the spray pattern of the poppet-type nozzle. In such case the leak-off fuel from the low pressure side of the nozzle needle is connected either directly to the return line or to a backpressure regulator to achieve variable nozzle opening pressure.

BRIEF DESCRIPTION OF THE DRAWINGS

The invention will be further described in the following, in a non-limiting way with reference to the accompanying drawings in which.

Like reference numbers are used to designate corresponding parts of the systems depicted in the drawings.

DETAILED DESCRIPTION

Figure 1:
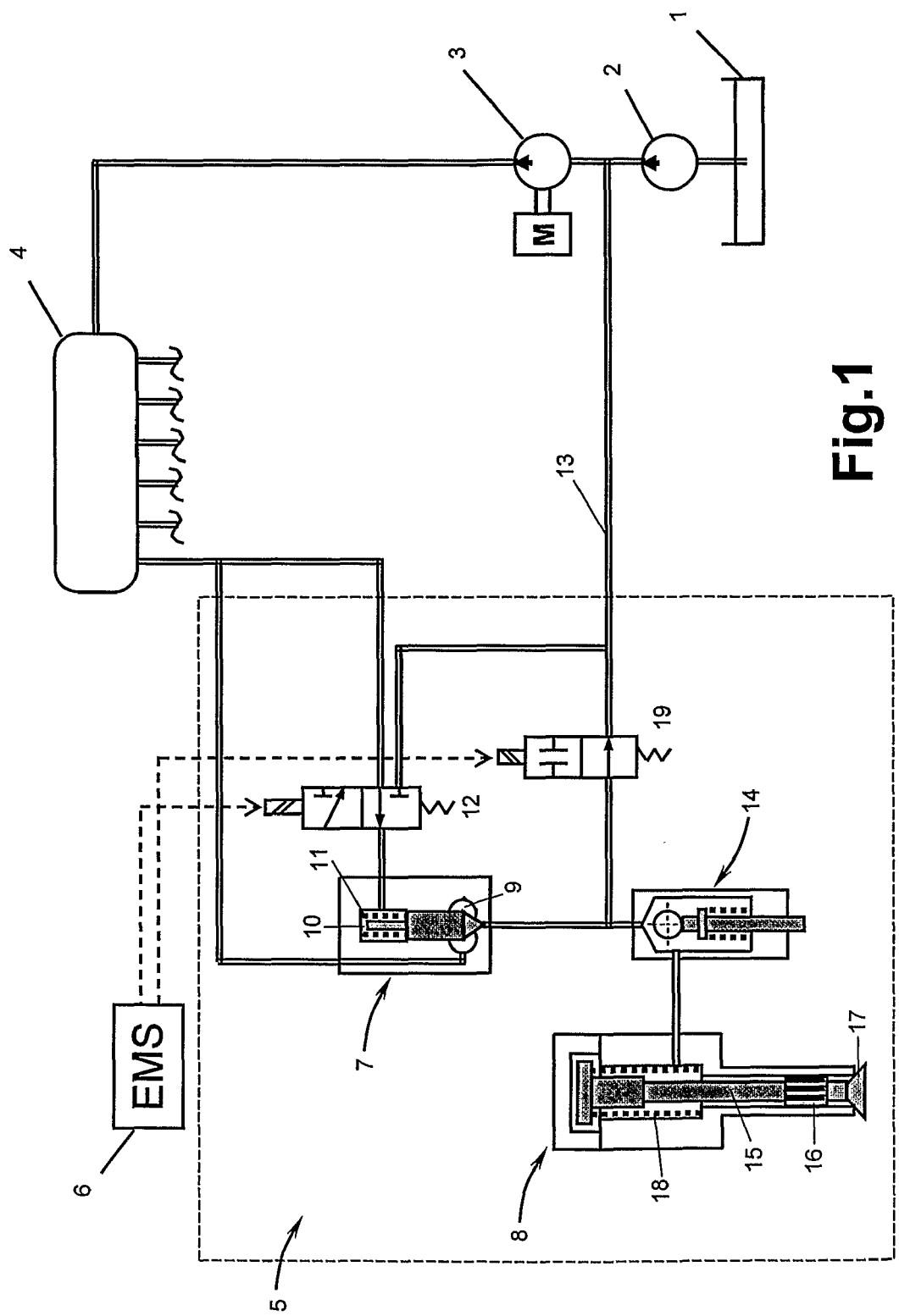
FIG. 1 is a schematic view of a preferred embodiment of the fuel injection system according to the present invention.

Referring to FIG. 1, there is provided a low-viscosity fuel feed system including a fuel tank 1, a feed pump 2 and associated components (not shown), a high-pressure pump 3, a common rail 4, to which a plurality of injectors 5 are connected, and an engine management system 6. A hydraulically operated valve 7 is connected between the common rail 4 and the inlet of a nozzle 8, the inlet of the hydraulically operated valve 7 being connected to the common rail 4. The hydraulically operated valve preferably has a precision-matched stem and forms an outlet chamber 9 and a control chamber 10, and is preferably biased towards its closed position by a resilient means 11. The control chamber 10 of the valve 7 can be connected by a three-way pilot valve 12 to either the common rail 4 or a return line 13, depending on commands from the Engine Management System (EMS) 6. The outlet of the hydraulically operated valve 7 is connected to the inlet of the nozzle 8 via a differential hydraulic valve 14. The nozzle 8 has a valve stem 15 with a guide 16 and a poppet 17. A resilient means 18 biases the nozzle towards closed position, and the nozzle can open when the pressure in the nozzle is built up sufficiently high to overcome the force of the resilient means 18 and the force of backpressure acting on the poppet 17 which, in use, is the pressure in the combustion chamber of the engine (not shown). A spill valve 19 that is controlled by the EMS 6, is connected between the outlet of the hydraulically operated valve 7 and the return line 13.

The differential hydraulic valve 14 is designed such that, once it is open, the area of the valve that is exposed to the pressure of the fuel is sufficiently big to hold the valve open against the force of the valve's return spring when the pressure in the valve is anywhere from slightly below the feed pressure in the system or above that level. In case of engine being stopped and the feed pressure falling below a predetermined level, the valve 14 closes and the area of the valve exposed to the pressure upstream of the valve becomes relatively small, such that a pressure above the feed pressure level is required to re-open the valve 14. The design of such a valve is known in the art and is disclosed, for example, in the U.S. Pat. No. 6,189,517 B1.

The system according to the embodiment of FIG. 1 works as follows: in a no-injection state but with the engine running, there is feed pressure downstream of the feed pump 2 and in the return line 13; the high-pressure pump pressurizes the fuel to a certain level and maintains that level in the common rail 4. The valves 12 and 19 are not activated by the EMS 6. The three-way pilot valve 12, in its de-activated position, connects the common rail 4 to the control chamber 10 of the hydraulically operated valve 7. The pressure from the common rail, combined with the force of the resilient means 11, holds the valve 7 in its closed position. The spill valve 19 is open, connecting the outlet of the hydraulically operated valve 7 to the return line 13. The differential hydraulic valve 14 is open, and pressure in the nozzle 8 equals pressure in the return line 13. The nozzle is closed by the combined force of the resilient means 18 and the backpressure acting on the poppet 17.

To begin an injection, the EMS applies a control current to the pilot valve 12, which disconnects the control chamber 10 of the hydraulically operated valve 7 from the common rail 4 and connects it to the return line 13. The pressure in the control chamber 10 falls and allows the common rail pressure acting on the valve 7 from the outlet chamber 9 to open the valve 7 against the force of the resilient means 11. At about the same time, the EMS closes the spill valve 19, so that the fuel cannot escape to the return line 13 while the hydraulically operated valve 7 is open. Fuel pressure in the line connecting the outlet chamber 9 of the valve 7 and the nozzle 8 rises and, upon reaching the nozzle opening pressure, the nozzle opens with the poppet 17 moving towards the combustion chamber of the engine, and fuel injection begins.

To end the injection, the EMS de-activates the pilot valve 12, which then disconnects the control chamber 10 from the return line 13 and connects it back to the common rail. The pressure in the control chamber 10 rises and, together with the resilient means 11, forces the valve 7 down towards the closed position. Any throttling effect in the seat of the valve 7 assists the valve closure. During the closing period of valve 7 and corresponding reduction of its flow area, the fuel continues to be injected from the open nozzle and the pressure in the nozzle falls. Typically, the hydraulically operated valve 7 closes first and then, when the pressure in the nozzle falls down sufficiently, the nozzle also closes. Following this, the EMS opens the spill valve 19 so that a relatively high residual pressure that may have been left in the nozzle at the nozzle closing is relieved back into the return line 13. This minimizes the risk of the fuel leaking through the closed nozzle into the combustion chamber, which leads to increased exhaust emissions.

If it becomes desirable, the closure of the valve 7 and the nozzle 8 can be made quicker by relatively early reopening of the spill valve 19. Such an early re-opening will increase the rate of pressure decay in the nozzle and downstream of the hydraulically operated valve 7 and therefore assist in earlier closing of the valve and the nozzle. This mode of operation may be beneficial in the conditions where very small injections, such as pilot injections, have to be performed.

Other possibilities also exist in controlling the injection pattern with the present invention. For instance, the pilot valve can be cycled ON/OFF in the first part of fuel injection to modulate the injection pressure through controlling the lift of the hydraulically operated valve 7.

Figure 2:
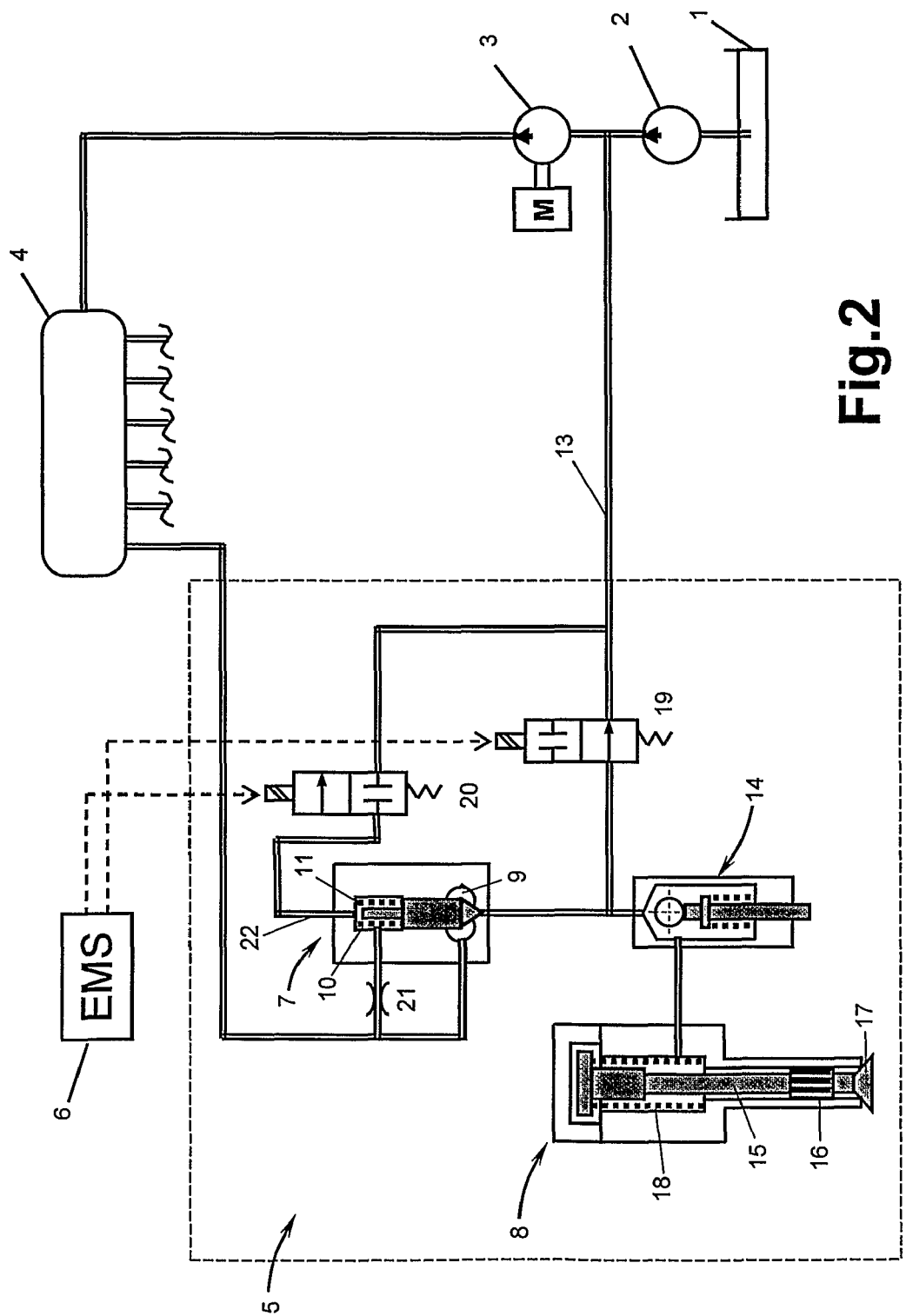
FIG. 2 is a schematic view of a second embodiment of the fuel injection system according to the present invention.

Another embodiment of the present invention, illustrated in FIG. 2, differs from the preferred embodiment of FIG. 1 in that, instead of a three-way pilot valve, a two-way pilot valve 20 is used to control the hydraulically operated valve 7. In this embodiment, the control chamber 10 is connected to the common rail with a channel having a restriction 21, and the flow area of this restriction and the maximum flow area of the pilot valve 20 are set in such a way that, with the valve 20 fully open, the pressure in the control chamber 10 of the hydraulically operated valve 7 falls and allows the valve 7 to open. The system may also be designed in the way known in the high-pressure diesel fuel injectors, such that the valve 7, upon approaching the fully open position, closes off the entrance to a channel 22 connecting the control chamber 10 with the pilot control valve 20, thus minimizing the leakage from the common rail, past the restriction 21, control chamber 10 and the open poppet valve 20 back to the return line 13.

Figure 3:
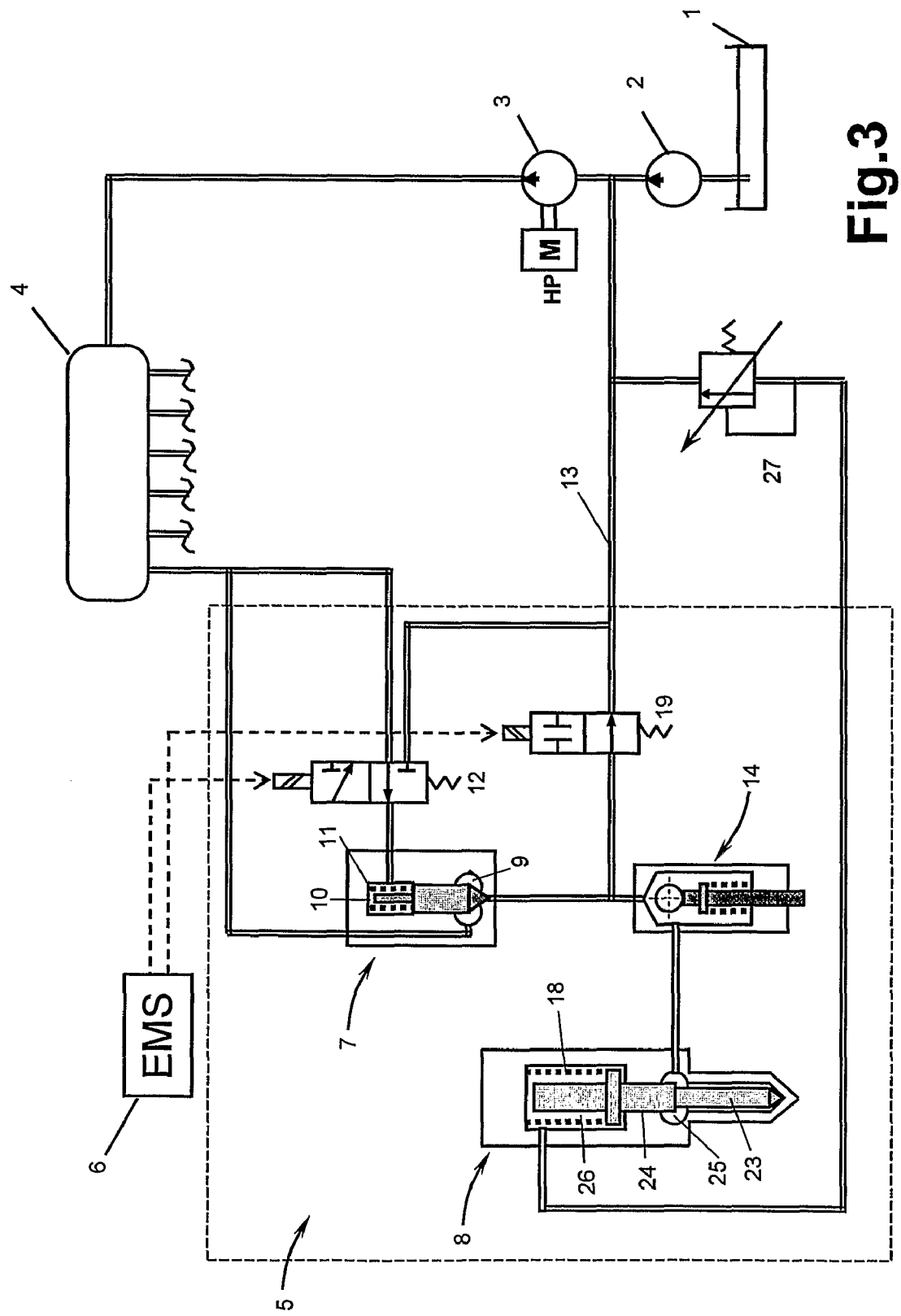
FIG. 3 is a schematic view of another embodiment of the present invention in which a conventional high-pressure diesel injection nozzle is used.

In the embodiment shown in FIG. 3, the design of the system according to the present invention is in principle the same as described above, but a conventional nozzle 8 is used. The nozzle has a needle 23 with a precision-matched guide 24 that isolates the nozzle pressure chamber 25 from the spring chamber 26. The spring chamber 26 is connected either directly to the return line 13 or, as shown in the FIG. 3, to a pressure regulator 27 which may be made electronically controlled to set optimum nozzle opening pressure at each engine operating condition.

The invention is not limited to the above-described embodiments, but several modifications are possible within the scope of the following claims.

The invention claimed is:

1. A fuel injection system for an internal combustion system, comprising
    an Engine Management System,
    a fuel feed pump,
    a return line,
    a high-pressure pump supplying fuel under pressure to a common rail,
    a hydraulically operated valve forming an outlet chamber connected to the common rail and a control chamber, the hydraulically operated valve being designed such that, in a closed position thereof, the valve prevents flow out of the outlet chamber,
    an electrically operated pilot valve adapted to control a position of the hydraulically operated valve,
    a nozzle with a resilient member that biases the nozzle towards closing, the nozzle being connected to an outlet of the hydraulically operated valve in such a way that pressure at the outlet of the hydraulically operated valve tends to overcome a force of the resilient member and open the nozzle, and
    an electrically operated spill valve connected between the outlet of the hydraulically operated valve and the return line.

2. A fuel injection system according to claim 1, wherein the electrically operated pilot valve is a three-way valve that can alternately connect the control chamber to either the common rail or the return line.

3. A fuel injection system according to claim 1, wherein the control chamber is connected via a restriction to the common rail and the electrically operated pilot valve is a two-way valve that can connect the control chamber to the return line, wherein flow areas of the restriction and the open pilot valve are chosen such that, in an open position of the pilot valve, pressure in the control chamber falls and allows pressure in the outlet chamber to open the hydraulically operated valve.

4. A fuel injection system according to claim 3, wherein the hydraulically operated valve is adapted to close the connection between the control chamber and the pilot valve when the hydraulically operated valve is in an open position.

5. A fuel injection system according to claim 1, wherein there is a resilient means that biases the hydraulically operated valve towards its closed position.

6. A fuel injection system according to claim 1, wherein the nozzle incorporates a valve stem with a poppet designed such that pressure in the nozzle, acting on a part of the poppet, can overcome the force of the resilient member and backpressure outside the nozzle and open the nozzle by moving the stem with the poppet outward in the direction of the engine combustion chamber.

7. A fuel injection system according to claim 1, wherein the nozzle incorporates a needle with a guide forming a pressure chamber communicating with an inlet of the nozzle and a spring chamber, the nozzle being designed such that pressure in the pressure chamber acting on a part of the needle can overcome the force of the resilient member and open the nozzle by moving the needle in a direction away from the combustion chamber of the engine, and wherein the spring chamber is connected to the return line.

8. A fuel injection system according to claim 7, wherein the spring chamber is connected to a pressure regulator.

9. A fuel injection system according to claim 8, wherein the pressure regulator is electronically controlled by the Engine Management System.

10. A fuel injection system according to claim 1, wherein a differential hydraulic valve is installed upstream of the nozzle, the differential hydraulic valve being designed such that it is closed when the pressure upstream of the differential hydraulic valve is below a feed pressure which is characteristic to a running engine and that it is open when pressure upstream of the differential hydraulic valve is at or above a feed pressure which is characteristic to a running engine.

* * * * *